United States Patent
Kim (10) Patent No.: US 10,759,342 B2
(45) Date of Patent: Sep. 1, 2020

(54) APPARATUS AND METHOD FOR CONTROLLING COLLISION ALERT

(71) Applicant: MANDO CORPORATION, Pyeongtaek-si, Gyeonggi-do (KR)

(72) Inventor: Tak Gen Kim, Seongnam-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 16/294,222

(22) Filed: Mar. 6, 2019

(65) Prior Publication Data
US 2019/0275939 A1 Sep. 12, 2019

(30) Foreign Application Priority Data
Mar. 7, 2018 (KR) .................. 10-2018-0027038

(51) Int. Cl.
*B60Q 1/00* (2006.01)
*B60Q 9/00* (2006.01)

(52) U.S. Cl.
CPC .................. *B60Q 9/008* (2013.01)

(58) Field of Classification Search
CPC ........................................... B60Q 9/008
USPC ....................................... 340/435
See application file for complete search history.

(56) References Cited

U.S. PATENT DOCUMENTS

2017/0080857 A1* 3/2017 Herman ............. B60Q 9/008
2019/0016384 A1* 1/2019 Carlson ............. G05D 1/0274

FOREIGN PATENT DOCUMENTS

JP 2012-84038 A 4/2012

OTHER PUBLICATIONS

Office Action issued in corresponding Korean Application No. 10-2018-0027038, dated May 8, 2019.

* cited by examiner

Primary Examiner — Tanmay K Shah
(74) Attorney, Agent, or Firm — Morgan, Lewis & Bockius LLP

(57) ABSTRACT

The present disclosure relates to an apparatus and a method for assisting driving of a host vehicle, and more particularly to a technology for controlling whether to operate a vehicle collision alert device according to the circumstances surrounding the host vehicle. An apparatus for assisting driving of a host vehicle a sensor mounted to the host vehicle and having a field of view outside of the host vehicle and capturing images; and a controller communicatively connected to the sensor and configured to predict a driving route of the host vehicle based on a vehicle control command input from a driver; determine whether the host vehicle is able to travel along the predicted driving route based on surrounding space information on the host vehicle obtained from the captured images; and control a collision alert device of the host vehicle based on a result of determining whether the host vehicle is able to travel.

14 Claims, 6 Drawing Sheets

APPARATUS AND METHOD FOR CONTROLLING COLLISION ALERT

CROSS REFERENCE TO RELATED APPLICATION

This application claims priority from Korean Patent Application No. 10-2018-0027038, filed on Mar. 7, 2018, which is hereby incorporated by reference for all purposes as if fully set forth herein.

BACKGROUND OF THE INVENTION

1. Field of the Invention

The present disclosure relates to an apparatus and a method for assisting driving of a host vehicle and, more particularly, to a technology for controlling whether to operate a vehicle collision alert device according to the circumstances surrounding a host vehicle.

2. Description of the Prior Art

Within an increase in car sales and a steadily growing traffic accident rate, secure vehicle driving is required. Accordingly, safety devices to assist safe vehicle driving, that is, various collision alert devices such as a Blind Spot Detection (BSD) device and a Rear Cross Traffic Alert (RCTA) device, have come to be mounted in vehicles. Once each alert condition is satisfied, these collision alert devices may indiscriminately provide an alert pertaining to a collision even when a vehicle cannot actually move to a position where the collision may occur, thus distracting the driver.

SUMMARY OF THE INVENTION

Therefore, an aspect of the present disclosure is to provide a technology for controlling a collision alert device of a vehicle.

Further, an aspect of the present disclosure is to provide a technology for operating a collision alert device only when actually necessary.

Also, an aspect of the present disclosure is to provide a technology for limiting the operation of a collision alert device when not actually necessary.

In addition, an aspect of the present disclosure is to provide a technology for controlling whether to operate a collision alert device in view of an expected driving route of a vehicle.

In accordance with an aspect of the present disclosure, there is provided an apparatus for assisting driving of a host vehicle including: a sensor mounted to the host vehicle and having a field of view outside of the host vehicle and capturing images; and a controller communicatively connected to the sensor and configured to predict a driving route of the host vehicle based on a vehicle control command input from a driver, determine whether the host vehicle can travel along the predicted driving route based on surrounding space information on the host vehicle obtained from the captured images, and control the collision alert device of the host vehicle based on a result of determining whether the host vehicle can travel.

In accordance with still another aspect of the present disclosure, there is provided a Method for assisting driving of a host vehicle including: predicting a driving route of a host vehicle based on a vehicle control command input from a driver; determining whether the host vehicle can travel along the predicted driving route based on surrounding space information on the host vehicle; and controlling the collision alert device of the host vehicle based on a result of determining whether the host vehicle can travel.

According to one embodiment of the present disclosure, it is possible to control a collision alert device of a host vehicle.

Further, according to another embodiment of the present disclosure, it is possible to operate a collision alert device only when actually necessary.

Also, according to still another embodiment of the present disclosure, it is possible to limit the operation of a collision alert device when not actually necessary.

In addition, according to yet another embodiment of the present disclosure, it is possible to control whether to operate a collision alert device in view of an expected driving route of a host vehicle.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

The present disclosure may have various modifications and embodiments, and thus particular embodiments illustrated in the drawings will be described in detail in the following description. However, it should be understood that there is no intent to limit the present disclosure to the particular forms disclosed, but on the contrary, the present disclosure is to cover all modifications, equivalents, and alternatives falling within the spirit and scope of the disclosure. Further, in the description of the present disclosure, when it is determined that the detailed description of the related well-known technologies unnecessarily make the subject matter of the present disclosure unclear, the detailed description will be omitted. A singular expression as used in the specification and the claims should be construed as meaning "one or more" unless indicated otherwise.

Hereinafter, embodiments of the present disclosure will be described in detail with reference to the accompanying drawings, and in the description with reference to the accompanying drawings, the same or corresponding components have the same reference numeral, and a duplicate description therefor will be omitted.

Figure 1:
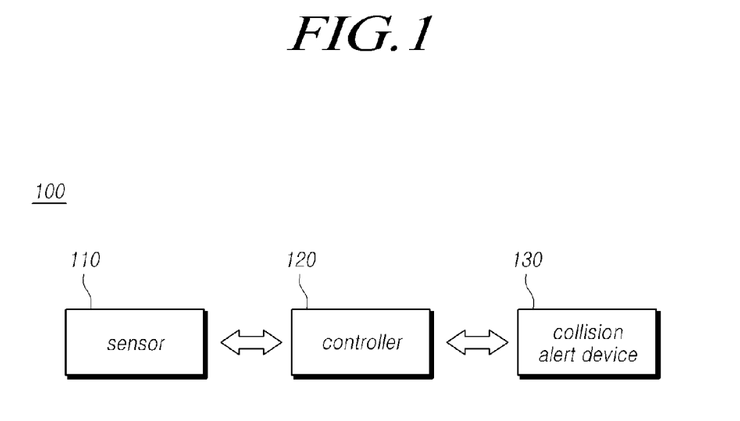
FIG. 1 illustrates the configuration of an apparatus for assisting driving of a host vehicle according to one embodiment of the present disclosure.

FIG. 1 illustrates the configuration of an apparatus for assisting driving of a host vehicle according to one embodiment of the present disclosure.

Referring to FIG. 1, the apparatus for assisting driving of a host vehicle 100 may include a sensor 110, a controller 120, and a collision alert device 130.

The sensor 110 may include all sensors mounted in a host vehicle, and each sensor may transmit detected sensing information to the controller 120.

In one embodiment, the sensor 110 may sense a vehicle control command input by a driver to the host vehicle in order to control vehicle driving and may transmit the sensed vehicle control command to the controller 120. Here, the vehicle control command may include any information that the driver inputs to the host vehicle, such as a steering angle, a gear, and a direction indication.

In one embodiment, the sensor 110 may scan a space surrounding the host vehicle and may transmit information on the scanned surrounding space to the controller 120. Here, the information on the surrounding space may be sensing information generated by a sensor capable of scanning a surrounding space, such as an image sensor, a radar sensor, an ultrasonic sensor, a lidar sensor, and an infrared sensor.

According to one example, the sensor 110 may include a camera module. For example, the camera module may include an image sensor configured to have a view of an inside or an outside of the host vehicle and to capture image data and a processor to process the captured image data.

For example, the image sensor may be mounted in the host vehicle to have a view of an inside or an outside of the host vehicle. At least one image sensor may be mounted on each part of the host vehicle to have a view of the front, a lateral side, or the rear of the host vehicle.

Image information captured by the image sensor includes image data and thus may be referred to as "image data captured by the image sensor". Hereinafter, in the present disclosure, image information captured by the image sensor is referred to as "image data captured by the image sensor".

The image data captured by the image sensor may be processed by the processor. The processor may operate to process the image data captured by the image sensor.

The processor may be configured in hardware, using at least one of electronic units capable of processing image data and performing other functions, such as Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, micro-controllers, or microprocessors.

A radar sensor or radar system used in the present disclosure may include at least one radar sensor unit, for example, one or more of a front radar sensor mounted on the front of a vehicle, a rear radar sensor mounted on the rear of a vehicle, and a lateral or lateral-rear radar sensor mounted on each lateral side of a vehicle. The radar sensor or radar system may analyze a transmission signal and a reception signal to process data and may detect information about an object accordingly. To this end, the radar sensor or radar system may include an Electronic Control Unit (ECU) or processor. Data transmission or signal communication from the radar sensor to the ECU may use an appropriate communication link, such as a vehicle network bus.

The radar sensor includes one or more transmission antennas for transmitting a radar signal and one or more reception antennas for receiving a reflection signal reflected from an object.

The radar sensor according to the present embodiment may adopt a signal transmission/reception scheme including a multi-dimensional antenna array and a Multiple-Input Multiple-Output (MIMO) scheme in order to form a virtual antenna aperture larger than an actual antenna aperture.

For example, a two-dimensional antenna array is used to achieve angular accuracy and resolution in horizontal and vertical directions. Using such a two-dimensional antenna array, signals are individually transmitted and received by two scans (temporally multiplexed) in horizontal and vertical directions, and MIMO may be used separately from the two-dimensional horizontal and vertical radar scans (temporally multiplexed).

Specifically, the radar sensor according to the present embodiment may adopt a two-dimensional antenna array configuration that includes a transmission antenna unit including a total of 12 transmission antennas (Tx) and a reception antenna unit including 16 reception antennas (Rx), and may thus have a total of 192 virtual reception antenna arrangements.

In this case, the transmission antenna unit has three transmission antenna groups, each of which includes four transmission antennas, wherein a first transmission antenna group may be spaced apart from a second transmission antenna group by a predetermined distance in the vertical direction, and the first or second transmission antenna group may be spaced apart from a third transmission antenna group by a predetermined distance (D) in the horizontal direction.

In addition, the reception antenna unit may include four reception antenna groups, each of which includes four reception antennas. The reception antenna groups may be mounted to be spaced apart in the vertical direction, and the reception antenna unit may be mounted between the first transmission antenna group and the third transmission antenna group, which are spaced apart in the horizontal direction.

In another embodiment, antennas for the radar sensor may be mounted in a two-dimensional antenna array. In one example, each antenna patch has a rhombic lattice arrangement, thereby reducing unnecessary side lobes.

Alternatively, the two-dimensional antenna array may include a V-shaped antenna array in which a plurality of radiation patches is mounted in a V shape. More specifically, the two-dimensional antenna array may include two V-shaped antenna arrays. Here, a single feed is made to the apex of each V-shaped antenna array.

Alternatively, the two-dimensional antenna array may include an X-shaped antenna array in which a plurality of radiation patches is mounted in an X shape. More specifically, the two-dimensional antenna array may include two X-shaped antenna arrays. Here, a single feed is made based on the center of each X-shaped antenna array.

In addition, the radar sensor according to the present embodiment may use an MIMO antenna system in order to achieve sensing accuracy or resolution in the vertical and horizontal directions.

Specifically, in the MIMO system, each transmission antenna may transmit a signal having an independent waveform that is distinct from that of another signal. That is, each transmission antenna may transmit a signal having an independent waveform that is distinct from that of signals from other transmission antennas, and each reception antenna may determine from which transmission antenna a reflection signal reflected from an object was transmitted on the basis of these different waveforms of signals.

Further, the radar sensor according to the present embodiment may be configured to include a radar housing for accommodating a substrate including transmission and reception antennas and a circuit, and a radome forming the appearance of the radar housing. Here, the radome may include a material capable of reducing the attenuation of transmitted and received radar signals, and may be formed as front and rear bumpers, a grille or a side body of a vehicle, or the outside surface of a vehicle component.

That is, the radome of the radar sensor may be mounted inside a vehicle grille, a bumper, a car body, or the like, or may be mounted as a part of a component forming the outside of a vehicle, such as a vehicle grille, a bumper, and a car body part, thereby improving the aesthetic appearance of a vehicle and providing convenience in mounting the radar sensor.

A lidar sensor may include a laser transmitter, a receiver, and a processor. The lidar sensor may be configured in a Time-Of-Flight (TOF) scheme or a phase-shift scheme.

The TOF lidar sensor emits a laser-pulse signal and receives a reflection pulse signal reflected from an object. The lidar sensor may measure the distance to the object based on the time at which the laser-pulse signal is emitted and the time at which the reflected pulse signal is received. Further, the TOF lidar sensor may measure speed relative to the object based on the change in the distance over time.

The phase-shift lidar sensor may emit a laser beam continuously modulated with a specific frequency and may measure time and the distance to an object based on the variation in the phase of a signal reflected to return from the object. Further, the phase-shift lidar sensor may measure speed relative to the object based on the change in the distance over time.

The lidar sensor may detect an object based on a transmitted laser and may detect the distance to the detected object and speed relative to the object. When the object is a stationary object (e.g., a roadside tree, a street lamp, a traffic light, or a traffic sign), the lidar sensor may detect the driving speed of the vehicle based on the Time of Flight using the object.

An ultrasonic sensor may include an ultrasonic transmitter, a receiver, and a processor.

The ultrasonic sensor may detect an object based on transmitted ultrasonic waves and may detect the distance to the detected object and the speed relative to the object. When the object is a stationary object (e.g., a roadside tree, a street lamp, a traffic light, or a traffic sign), the ultrasonic sensor may detect the driving speed of the vehicle based on the Time of Flight using the object.

The controller 120 may obtain data from at least one of the camera module, the lidar sensor, the radar sensor or the ultrasonic sensor, and may control various operations of the host vehicle based on the obtained data.

The controller 120 controls the operation of the collision alert device 130. Specifically, the controller 120 may control whether to operate the collision alert device 130 based on sensing information received from the sensor 110.

The collision alert device 130 includes any alert device that warns the driver of the possibility of a collision in order to assist secure driving of the vehicle, such as a Blind Spot Detection (BSD) device and a side collision warning device, and the operation thereof is determined depending on a control command received from the controller 120. A detailed description will be given below with reference to FIGS. 2 to 6.

In one embodiment, when a control command to limit the operation is received from the controller 120, the collision alert device 130 may not issue a collision alert even though an alert condition is satisfied. The collision alert device 130 may issue a collision alert when an alert condition is satisfied and the control command to limit the operation is not received from the controller 120. Here, the alert condition is a criterion preset in each collision alert device 130, and may be set differently for each vehicle and each collision alert device.

Figure 2:
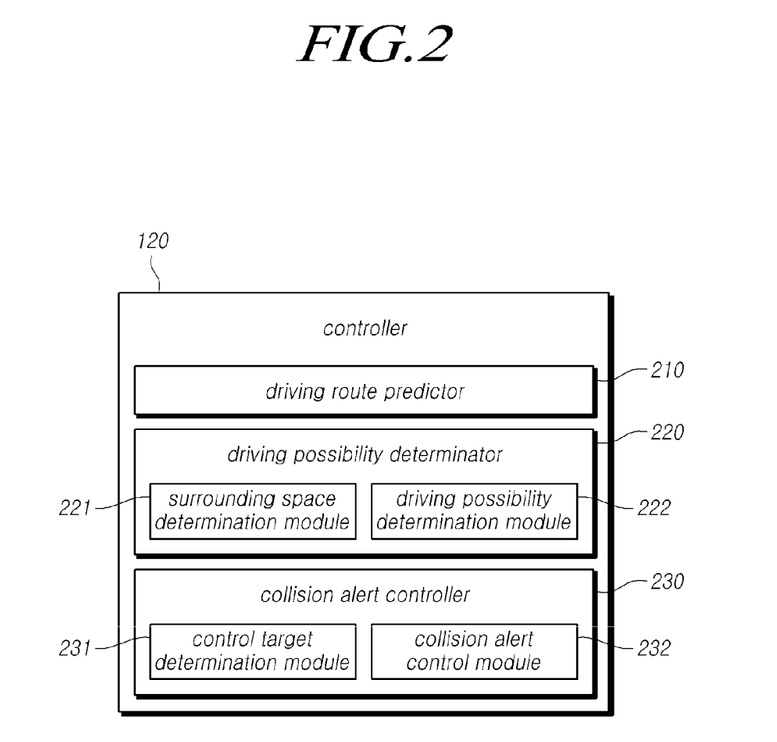
FIG. 2 is a block diagram illustrating a controller according to one embodiment of the present disclosure.

FIG. 2 is a block diagram illustrating a controller according to one embodiment of the present disclosure.

Referring to FIG. 2, the controller 120 according to the embodiment of the present disclosure may include a driving route predictor 210, a driving possibility determinator 220, and a collision alert controller 230.

The driving route predictor 210 may predict an expected driving route of a vehicle based on a vehicle control command input from the driver. For example, the driving route predictor 210 may predict advance, reversing, lane change, and the steering direction of the vehicle based on a vehicle control command input from the driver, such as a steering angle, an accelerator pedal, a brake pedal, a gear, and a direction indication.

The driving possibility determinator 220 may determine whether the vehicle can travel along a driving route predicted based on surrounding space scan information obtained by scanning a space surrounding the vehicle.

In one embodiment, the driving possibility determinator 220 may include a surrounding space determination module 221, to determine the space surrounding the vehicle that needs to be scanned based on the predicted driving route, and a driving possibility determination module 222, to determine whether the vehicle can travel along the predicted driving route based on surrounding space information on the determined surrounding space.

The collision alert controller 230 may control whether to operate a collision alert device 130 based on the result of determining whether the vehicle can travel.

In one embodiment, the collision alert controller 230 may include a control target determination module 231 to determine a collision alert device 130 as a control target based on the vehicle control command and the predicted driving route. For example, when the predicted driving route determined based on the vehicle control command input from the driver is a change to a right or left lane, the control target determination module 231 may determine, as a control target, a left or right BSD device that warns the driver of the possibility of a collision when changing lanes. Further, when the predicted driving route is reversing of the vehicle, the control target determination module 231 may determine a rear-side collision warning device as a control target.

In one embodiment, the collision alert controller 230 may include a collision alert control module 232 to control the collision alert device 130 determined based on the result of determining whether the vehicle can travel. Specifically, when the vehicle cannot travel along the predicted driving route, the collision alert control module 232 may generate a command to limit the operation of the determined collision alert device and may transmit the command to the collision alert control system.

In one embodiment, the controller may be implemented as a Domain Control Unit (DCU).

Figure 3:
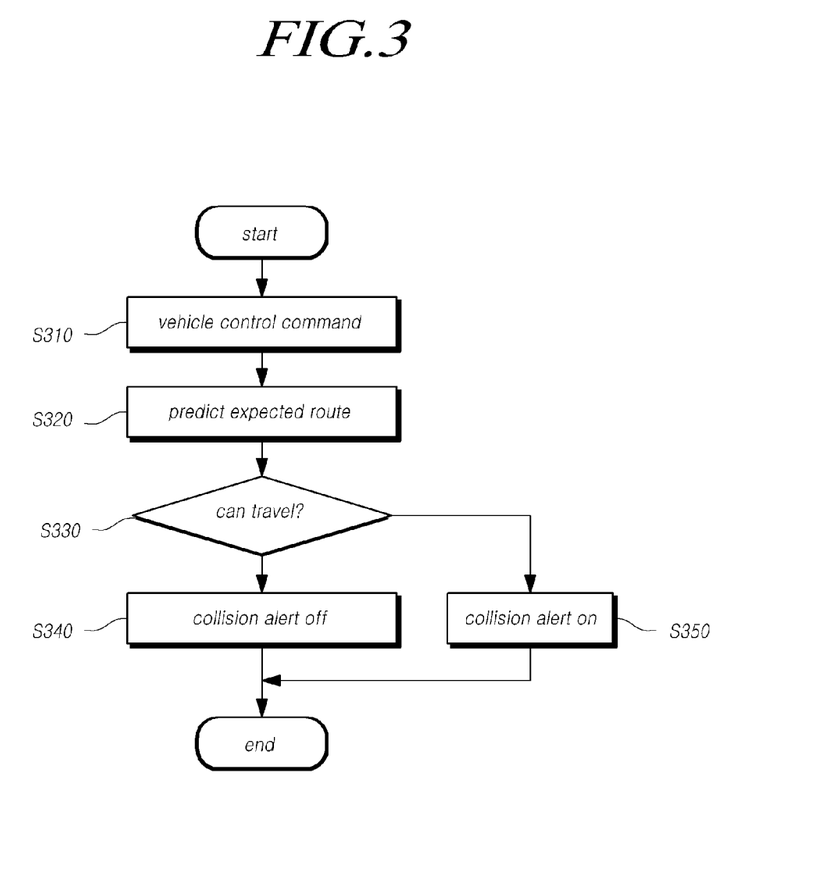
FIG. 3 is a flowchart illustrating a method for assisting driving of a host vehicle according to one embodiment of the present disclosure.

FIG. 3 is a flowchart illustrating a method for assisting driving of a host vehicle according to one embodiment of the present disclosure.

Hereinafter, this method will be described as being performed, for example, by the controller 120 shown in FIG. 1, and accordingly it will be apparent that the description of the controller 120 is extended to the method.

Referring to FIG. 3, in operation S310, a vehicle control command is input. The controller 120 receives a vehicle control command from the sensor 110.

In operation S320, a driving route is predicted. Specifically, the controller 120 may predict the driving route of the vehicle based on the vehicle control command input from the driver.

In operation S330, it is determined whether the vehicle can travel. Specifically, the controller 120 may determine whether the vehicle can travel along the predicted driving route based on surrounding space information, which is scanned information on a space surrounding the vehicle.

In operation S340, a collision alert is limited. Specifically, when it is determined that the vehicle cannot travel along the predicted driving route, the controller 120 may limit the operation of the collision alert device 130.

In operation S350, when a collision alert is not limited, specifically, when it is determined that the vehicle can travel along the predicted driving route, the controller 120 may not limit the operation of the collision alert device 130.

Figure 4:
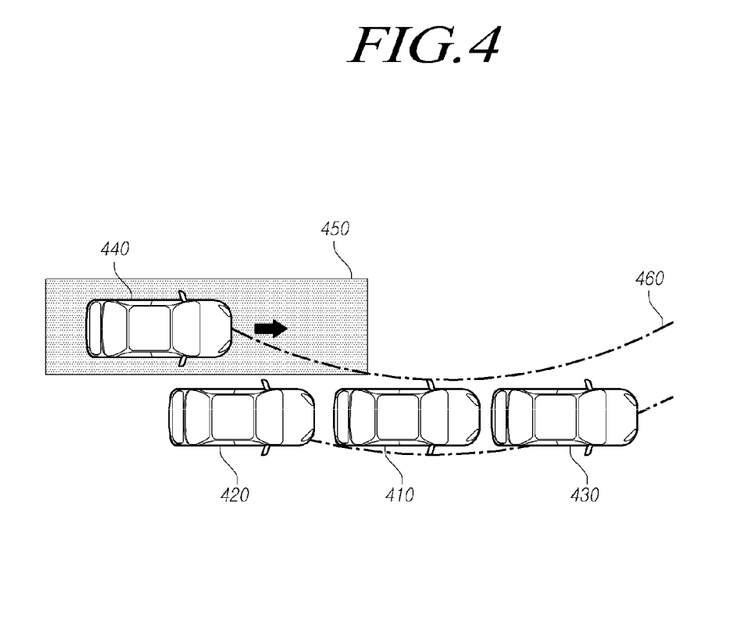
FIG. 4 illustrates an example of limiting a blind spot detection device according to one embodiment of the present disclosure.

FIG. 4 illustrates an example of limiting a BSD device according to one embodiment of the present disclosure.

Referring to FIG. 4, it is shown that there are vehicles 420 and 430 in front of and at the back of a vehicle 410 and that a vehicle is approaching the vehicle 410 from a rear-lateral side. Specifically, when the driver turns the steering wheel to the right to move the vehicle 410 to another lane, the controller 120 may predict a driving route 460 as shown in FIG. 4. Since a lane change is impossible due to the presence of the vehicles 420 and 430 in front of and at the back of the vehicle 410, the controller 120 may determine that the vehicle 410 cannot travel along the predicted driving route 460. Further, a BSD device mounted on the vehicle 410 may recognize that the rear-lateral vehicle 440 is approaching from the rear-lateral side 450 of the vehicle 410 and may determine that a rear-lateral alert condition is satisfied. Accordingly, the controller 120 can limit the operation of the BSD device because the rear-lateral vehicle 440 exists in the rear-lateral area but the lane change of the vehicle 410 is impossible.

Figure 5:
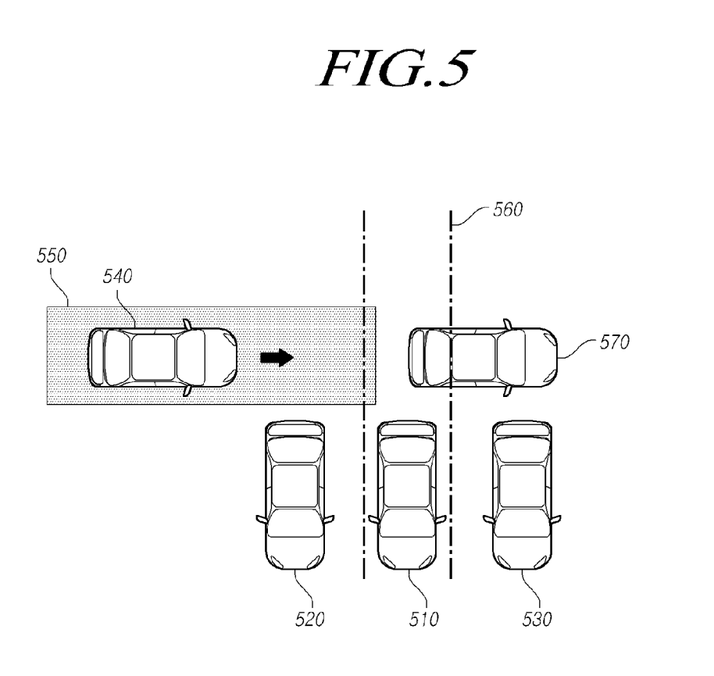
FIG. 5 illustrates an example of limiting a rear cross traffic alert device according to one embodiment of the present disclosure.

FIG. 5 illustrates an example of limiting an RCTA device according to one embodiment of the present disclosure.

Referring to FIG. 5, there are vehicles 520 and 530 at both sides of a vehicle 510, a double-parked vehicle at the rear side 550 of the vehicle 510, and a rear vehicle 540 approaching the vehicle 510 from the rear side 550. Specifically, when the driver inputs a vehicle control command of a rear gear in order to reverse the vehicle, the controller 120 may predict a driving route 560 as shown in FIG. 5. The controller 120 may determine that the vehicle 510 cannot travel along the predicted route due to the presence of the double-parked vehicle 570 on the predicted driving route 560. Further, an RCTA device mounted on the vehicle 510 may recognize that the rear vehicle 540 is approaching the vehicle 510 at the rear side 550 and may determine that a rear collision alert condition is satisfied. Accordingly, the controller 120 may limit the operation of the RCTA device because the rear vehicle 540 exists at the rear side 550 but reversing of the vehicle 510 is impossible.

Figure 6:
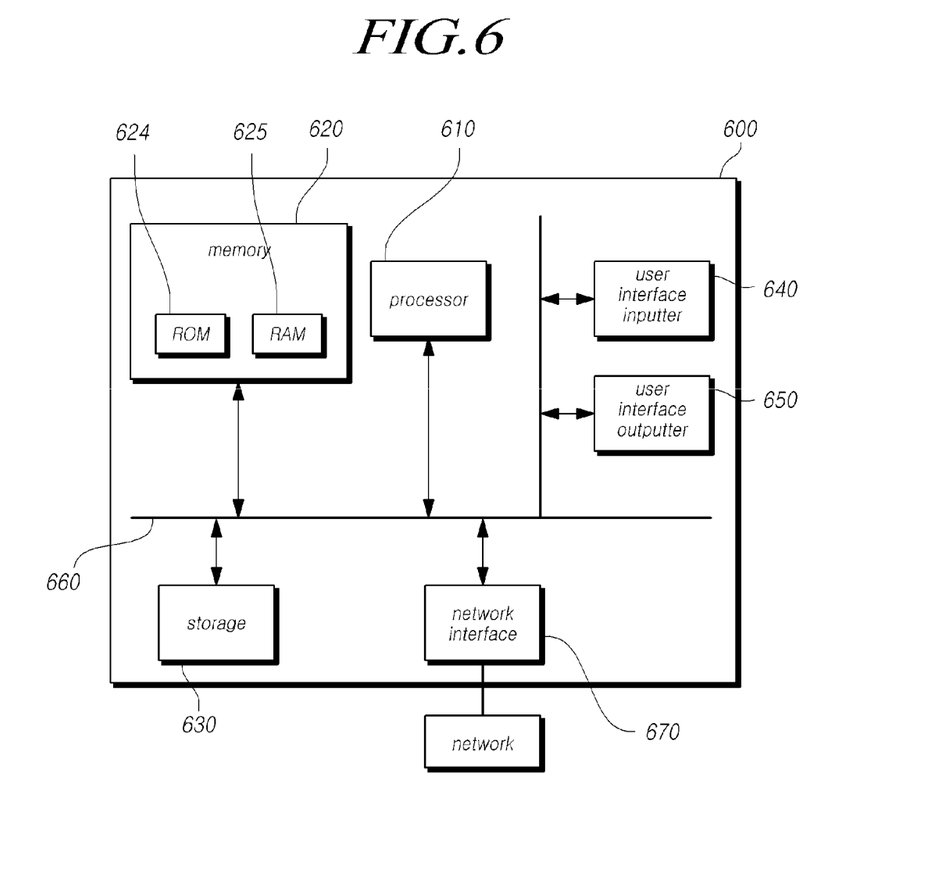
FIG. 6 is a block diagram illustrating a vehicle control device according to another embodiment of the present disclosure.

FIG. 6 is a block diagram illustrating a vehicle control device according to another embodiment of the present disclosure.

The foregoing embodiments of the present disclosure may be configured, for example, as a computer-readable recording medium in a computer system. As shown in FIG. 6, a computer system 600, such as the controller 120, may include at least one element among at least one processor 610, a memory 620, a storage 630, a user interface inputter 640, and a user interface outputter 650, which are capable of communicating with one another via a bus 660. In addition, the computer system 600 may also include a network interface 670 for connecting to a network. The processor 610 may be a CPU or a semiconductor device that executes a processing instruction stored in the memory 620 and/or the storage 630. The memory 620 and the storage 630 may include various types of volatile/non-volatile storage media. For example, the memory may include ROM 624 and RAM 625.

None of the claims in this application as filed are intended to be interpreted as having means-plus-function elements. Should Applicant wish to invoke Section 112(f) during prosecution, it will recite claim elements using the "means for" [performing a function] construct.

The embodiments of the present disclosure may be configured as a computer-implemented method or a non-volatile computer recording medium storing computer-executable instructions. These instructions, when executed by a processor, may perform a method according to at least one embodiment of the present disclosure.

The present disclosure has been described with reference to the embodiments. It will be understood by those skilled in the art that the present disclosure may be changed and modified in various forms without departing from the essential characteristics of the present disclosure. Therefore, the embodiments disclosed herein should be considered from an illustrative point of view, rather than a limitative point of view. The scope of the present disclosure is found not in the above description but in the accompanying claims, and all differences falling within the scope equivalent to the claims should be construed as being included in the present disclosure.

What is claimed is:

1. An apparatus for assisting driving of a host vehicle, comprising:
a driving route predictor configured to predict a driving route of the host vehicle based on a vehicle control command input from a driver;
a driving possibility determinator configured to determine whether the host vehicle is able to travel along the predicted driving route based on surrounding space information on the host vehicle; and
a collision alert controller configured to control a collision alert device of the host vehicle based on a result of determining whether the host vehicle is able to travel,
wherein the driving possibility determinator is configured to determine that the host vehicle is unable to travel from a parked position due to an object, separate from the host vehicle, being detected on the predicted driving route of the host vehicle and, in response to determining that the host vehicle is unable to travel from the parked position due to said object, the collision alert controller limits an operation of the collision alert device of the host vehicle to prevent the collision alert device from issuing a collision alert.

2. The apparatus of claim 1, wherein the vehicle control command comprises at least one of steering information, gear information, accelerator pedal information, or brake pedal information.

3. The apparatus of claim 1, wherein the driving possibility determinator comprises:
a surrounding space determination module configured to determine a surrounding space of the host vehicle that needs to be scanned based on the predicted driving route; and a driving possibility determination module configured to determine whether the host vehicle is able to travel based on the surrounding space information, which is scanned information on the determined surrounding space.

4. The apparatus of claim 1, wherein the collision alert controller comprises:
a control target determination module configured to determine a control target collision alert device based on at least one of the vehicle control command and the predicted driving route; and
a collision alert control module configured to control the collision alert device determined based on the result of determining whether the host vehicle is able to travel.

5. The apparatus of claim 1, wherein the driving route predictor predicts the driving route to be a left side or a right side of the host vehicle,
the driving possibility determinator determines whether the host vehicle is able to travel based on surrounding space information on a left or right space of the host vehicle, and
the collision alert controller controls a left or right collision alert device.

6. The apparatus of claim 1, wherein the driving route predictor predicts the driving route to be reversing of the host vehicle,
the driving possibility determinator determines whether the host vehicle is able to travel based on surrounding space information on reversing of the host vehicle, and
the collision alert controller controls a rear collision alert device.

7. The apparatus of claim 1, wherein in response to determining that the host vehicle is unable to travel from the parked position due to said object being positioned on the predicted driving route, the collision alert controller transmits a command to the collision alert device to prevent the collision alert device from issuing a collision alert even when an alert condition is satisfied.

8. A method for assisting driving of a host vehicle, comprising:
predicting a driving route of a host vehicle based on a vehicle control command input from a driver;
determining whether the host vehicle is unable to travel along the predicted driving route due to an object, separate from the host vehicle and detected based on surrounding space information on the host vehicle, being detected on the predicted driving route of the host vehicle; and
controlling a collision alert device of the host vehicle based on a result of determining whether the host vehicle is able to travel,
wherein the controlling the collision alert device comprises:
in response to determining that the host vehicle is unable to travel from a parked position due to said object, separate from the shot vehicle, being positioned on the predicted driving route, limiting an operation of the collision alert device of the host vehicle to prevent the collision alert device from issuing a collision alert.

9. The method of claim 8, wherein the vehicle control command comprises at least one of steering information, gear information, accelerator pedal information, or brake pedal information.

10. The method of claim 8, wherein the determining whether the host vehicle is able to travel comprises:
determining a surrounding space of the host vehicle that needs to be scanned based on the predicted driving route; and
determining whether the host vehicle is able to travel based on the surrounding space information, which is scanned information on the determined surrounding space.

11. The method of claim 8, wherein the controlling the collision alert device comprises:
determining a control target collision alert device based on at least one of the vehicle control command and the predicted driving route; and
controlling the collision alert device determined based on the result of determining whether the host vehicle is able to travel.

12. The method of claim 8, wherein the predicting a driving route comprises:
predicting the driving route to be a left side or a right side of the host vehicle,
the determining whether the host vehicle is able to travel comprises:
determining whether the host vehicle is able to travel based on surrounding space information on a left or right space of the host vehicle, and
the controlling the collision alert device comprises:
controlling a left or right collision alert device.

13. The method of claim 8, wherein the predicting a driving route comprises:
predicting the driving route to be reversing of the host vehicle,
the determining whether the host vehicle is able to travel comprises:
determining whether the host vehicle is able to travel based on surrounding space information on reversing of the host vehicle, and
the controlling the collision alert device comprises:
controlling a rear collision alert device.

14. The method of claim 8, wherein the controlling the collision alert device comprises, in response to determining that the host vehicle is unable to travel from the parked position due to said object being positioned on the predicted driving route, transmitting a command to the collision alert device to prevent the collision alert device from issuing a collision alert even when an alert condition is satisfied.

* * * * *